US010833542B2

(12) United States Patent
Ge et al.

(10) Patent No.: US 10,833,542 B2
(45) Date of Patent: Nov. 10, 2020

(54) HINGED STATOR CORE

(71) Applicant: ZHEJIANG LINIX MOTOR CO., LTD., Dongyang (CN)

(72) Inventors: Jianliang Ge, Dongyang (CN); Ting Wang, Dongyang (CN); Haojie Jiang, Dongyang (CN); Shuai Wang, Dongyang (CN)

(73) Assignee: ZHEJIANG LINIX MOTOR CO., LTD., Dongyang (CN)

( * ) Notice: Subject to any disclaimer, the term of this patent is extended or adjusted under 35 U.S.C. 154(b) by 159 days.

(21) Appl. No.: 16/148,829

(22) Filed: Oct. 1, 2018

(65) Prior Publication Data

US 2019/0157919 A1 May 23, 2019

(30) Foreign Application Priority Data

Nov. 21, 2017 (CN) .......................... 2017 1 1164303

(51) Int. Cl.
*H02K 1/14* (2006.01)
(52) U.S. Cl.
CPC .................... *H02K 1/148* (2013.01)
(58) Field of Classification Search
USPC ................................................... 310/216.078
See application file for complete search history.

(56) References Cited

U.S. PATENT DOCUMENTS

| 9,000,650 | B2* | 4/2015 | Bach Andersen | ..... H02K 1/148 |
| | | | | 310/216.007 |
| 9,136,735 | B2* | 9/2015 | Hashimoto | ............ H02K 1/148 |
| 9,306,421 | B2* | 4/2016 | Lee | ............................ B22F 1/02 |
| 2014/0361657 | A1* | 12/2014 | Vohlgemuth | ........... H02K 1/185 |
| | | | | 310/216.009 |

(Continued)

FOREIGN PATENT DOCUMENTS

DE 102017201178 A1 * 7/2018 ............... H02K 1/08

*Primary Examiner* — Forrest M Phillips
(74) *Attorney, Agent, or Firm* — Jiwen Chen; Jacobson Holman PLLC

(57) ABSTRACT

The present invention discloses a hinged stator core. The hinged stator core consists of a plurality of individual iron cores each comprising teeth on an inner side and a yoke on an outer side; two adjacent individual iron cores are connected by a hinge structure comprising a hinge and a hinge slot fitted with the hinge, with both the hinge and the hinge slot being arranged on the yoke of the individual iron core; the hinge and the hinge slot are arranged on a side, which rotates about a rotor shaft clockwise and/or on a side, which rotates about a rotor shaft counterclockwise, of the yoke of the individual iron core; the hinge consists of a fitting segment fitted with the hinge slot and a connecting segment for connecting the fitting segment with the yoke; the fitting segment has a circular or segmental shape along a radial cross-section of the rotor shaft; the hinge slot has an arced shape along the radial cross-section of the rotor shaft; and both a center of a circle of the fitting segment of the hinge and a center of a circle of the hinge slot are in the circum- (Continued)

ference of a circle taking a center of the stator core as its center. The present invention has the advantages of convenient manufacturing and processing, more convenient wire winding, and high integrity of the magnetic circuit.

1 Claim, 1 Drawing Sheet

(56) References Cited

U.S. PATENT DOCUMENTS

| | | | | |
|---|---|---|---|---|
| 2015/0364954 | A1* | 12/2015 | Senoo | H02K 1/14 310/216.009 |
| 2017/0149295 | A1* | 5/2017 | Kawasaki | H02K 1/148 |
| 2019/0393739 | A1* | 12/2019 | Seo | H02K 1/148 |
| 2020/0106312 | A1* | 4/2020 | Taniguchi | H02K 1/148 |

* cited by examiner

HINGED STATOR CORE

This application claims the priority benefit of Chinese Application No. 201711164303.7, filed Nov. 21, 2017 in Chinese, which is hereby incorporated by reference.

TECHNICAL FIELD OF THE INVENTION

The present invention relates to a stator core and in particular to a hinged stator core.

BACKGROUND OF THE INVENTION

As an important component of a motor, the motor stator comprises a stator core, a stator winding and a housing. A conventional stator core is structured in an entire circle and the entire circle cannot be separated. A desired number of slots are uniformly distributed on the entire circle. For such a conventional stator core, the stator core is obtained by directly stamping a plurality of silicon steel sheets by a stamping press. Although this method is fast and convenient for the production of the stator core, it is quite difficult to wind the wire onto the stator core structured in an entire circle. Material waste is caused, and the way of winding directly influences the working efficiency of the motor. Chinese Patent Application No. 201710109881.4 disclosed a stator core consisting of a plurality of individual iron cores. The wire is wound onto the individual iron cores, and the whole stator core is then fixed in an entire circle at the end of wire winding. However, during the wire winding, the individual iron cores may be disengaged from each other. There are still problems of difficult wire winding and high material waste.

SUMMARY OF THE INVENTION

An object of the present invention is to provide a hinged stator core which facilitates wire winding.

For this purpose, the present invention employs the following technical solution. A hinged stator core is provided, the hinged stator core consists of a plurality of individual iron cores each comprising teeth on an inner side and a yoke on an outer side. Two adjacent individual iron cores are connected by a hinge structure comprising a hinge and a hinge slot fitted with the hinge, with both the hinge and the hinge slot being arranged on the yoke of the individual iron core. The hinge and the hinge slot are arranged on a side, which rotates about a rotor shaft clockwise and/or on a side, which rotates about a rotor shaft counterclockwise, of the yoke of the individual iron core. The hinge consists of a fitting segment fitted with the hinge slot and a connecting segment for connecting the fitting segment with the yoke. The fitting segment has a circular or segmental shape along a radial cross-section of the rotor shaft. An outside edge of the connecting segment looks like a sloped structure which runs from the yoke side to the fitting segment side and extends inward, an inside edge of the connecting segment looks like a sloped structure which runs from the yoke side to the fitting segment side and extends inward, and the inside edge of the connecting segment is entirely located outside endpoints of the fitting segment. A notch, which gives the way to the connecting segment of the hinge, is formed at an end of an outer edge of a side, which rotates along the rotor shaft, of the yoke. An opening of the hinge slot is communicated with the notch. The hinge slot has an arced shape along the radial cross-section of the rotor shaft, with an arc angle of above 180°. Both a center of a circle of the fitting segment of the hinge and a center of a circle of the hinge slot are in the circumference of a circle taking a center of the stator core as its center. The opening of the hinge slot has a width less than a diameter of the fitting segment of the hinge. The yoke comprises an external yoke segment and an internal yoke segment. The notch, the hinge slot and the hinge are all located on the external yoke segment, and the internal yoke segment looks like a trapezoidal structure which is narrow inside and wide outside; all the individual iron cores are connected to form the stator core, so that sides of the trapezoidal structures of the internal yoke segments of two adjacent individual iron cores are pressed against each other, an inner edge of the connecting segment of the hinge is pressed against an outer edge of the internal yoke segment, and the outer edge of the internal yoke segment is in smooth connection to the opening of the hinge slot.

Due to the arrangement of the hinge and the hinge slot in the present invention, adjacent individual iron cores can be connected only by axial insertion. It is difficult for the individual iron cores, which are well connected, to disengage from each other along the rotation direction of the rotor shaft. In the present invention, the individual iron cores may be connected pairwise. The individual iron cores may be arranged in a line in the wire winding procedure, without connecting the first and last individual iron cores. At the end of wire winding, the first and last individual iron cores are connected to form a circular stator core. Finally, a circular stator core of considerable mechanical strength is formed by laser welding. The arrangement of the hinge in a segmental or circular shape can prevent the disengagement of adjacent individual iron cores from each other. The arrangement of the connecting segment of the hinge and the arrangement of the notch can avoid the interference between the hinge and the external yoke segment when the individual iron cores are connected and unfolded in a line. The arrangement of the external yoke segment provides support to adjacent individual iron cores when they are connected and folded in a circle, and also ensures the strength of the magnetic circuit. A side of the stator core, which has been assembled, close to the housing is regarded as the outer side, and a side thereof close to the rotor shaft is regarded as the inner side.

Preferably, one of the hinge and the hinge slot is arranged on a side, which rotates about the rotor shaft clockwise, of the yoke of the individual iron core, and the other one of the hinge and the hinge slot is arranged on a side, which rotates about the rotor shaft counterclockwise, of the yoke of the individual iron core. Such an arrangement is convenient for the manufacturing and assembling of the individual iron cores in the present invention.

Preferably, the individual iron cores of the stator core have a same structure, size and shape. Such an arrangement is convenient for the manufacturing and assembling of the individual iron cores in the present invention.

Preferably, a centerline of an included angle formed by two sides of the trapezoidal structure of the internal yoke segment is on a diameter line of the stator core. Such an arrangement effectively ensures the circularity and outer and inner diameters of the whole stator core, and avoids excessive or insufficient winding of the wire.

Preferably, the center of the external yoke segment is recessed inward to form a positioning groove, and the positioning groove looks like a trapezoidal structure which is wide inside and narrow outside. The positioning groove serves as a positioning base during the wire winding, so that the wire winding is more convenient.

Preferably, an inner rim of the internal yoke segment is arranged linearly and is in smooth connection to the teeth.

That is, a surface where the individual iron core is fitted with a coil framework is flat. This can provide for a more appropriate winding layout in order to facilitate the wire winding, and also can make the wound wire more compact.

Preferably, the individual iron core has a plurality of through slots which axially runs through the individual iron core along the rotor shaft, and the through slots are elongated; and the individual iron core comprises a plurality of first slots and a plurality of second slots; there is an included angle between one of the first slots and one of the second slots; the first slots are arranged symmetrically about the second slots; and the first slots are located on the yoke. The arrangement of the first slots and the second slots can greatly improve the torsional strength and ensure the peeling strength of the whole core.

Preferably, there are two first slots and two second slots, the second slots are located on a symmetric line of the teeth, and the first slots and the second slots are vertical to each other. Such an arrangement maximizes the torsional strength and ensures the peeling strength of the whole core.

Preferably, an inner rim of the hinge of the individual iron core has a same shape as an outer rim of the internal yoke segment of an adjacent individual iron core and an inner rim of the hinge slot, the hinge is fitted with the hinge slot so that the inner edge of the hinge of one individual iron core is tightly and seamlessly connected to the outer edge of the internal yoke segment of an adjacent individual iron core. The tight and seamless connection of the inner edge of the hinge of one individual iron core to the outer edge of the internal yoke segment of an adjacent individual iron core ensures the integrity of the magnetic circuit of the motor.

Preferably, gaps are formed between the teeth of the individual iron cores of the stator core. Such an arrangement enhances the overload capacity with the same power while ensuring the cogging torque.

The present invention has the advantages of convenient manufacturing and processing, more convenient wire winding, and high integrity of the magnetic circuit.

DETAILED DESCRIPTION OF THE INVENTION

The present invention will be further described below by specific embodiments with reference to accompanying drawings.

Figure 1:
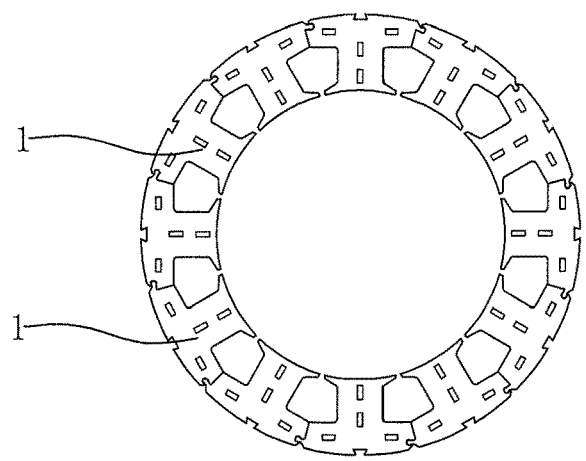
FIG. 1 is a structural diagram of a stator core of the present invention.
Figure 2:
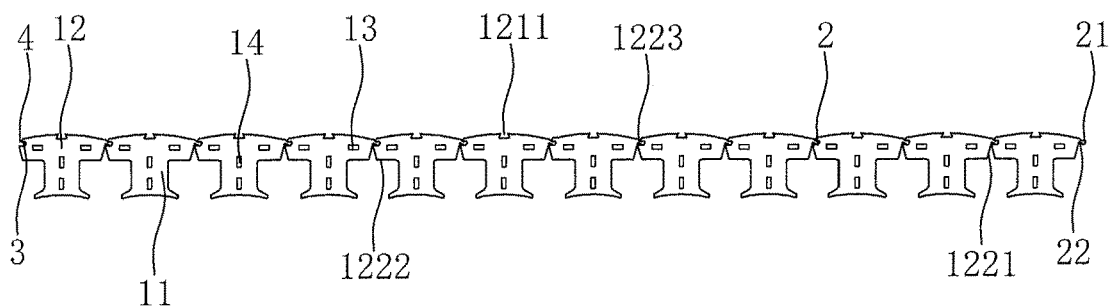
FIG. 2 is a structural diagram of an individual iron core of the present invention.
Figure 3:
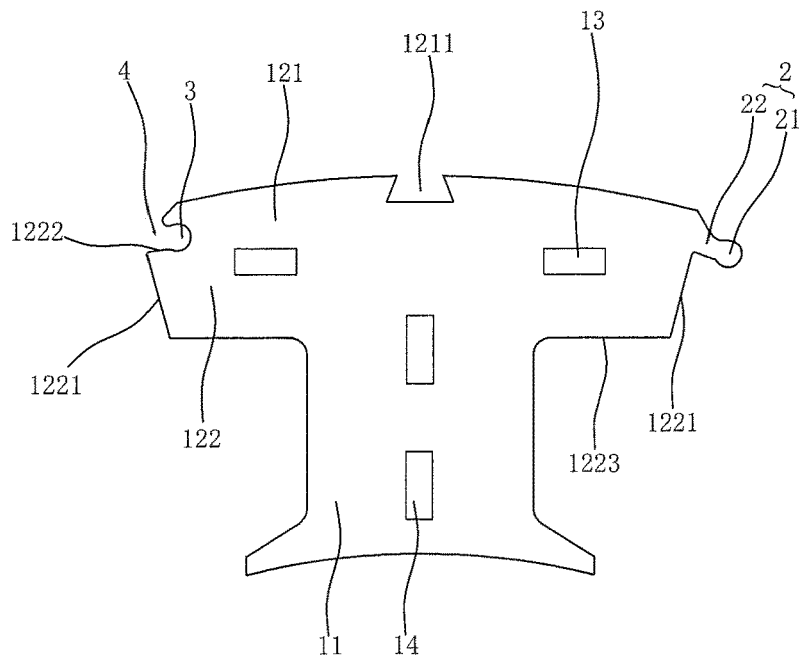
FIG. 3 is a structural diagram of winding the wire onto the stator core in the present invention.

As shown in FIGS. 1, 2 and 3, a hinged stator core in the present invention consists of twelve individual iron cores 1 each comprising teeth 11 on an inner side and a yoke 12 on an outer side; two adjacent individual iron cores 1 are connected by a hinge structure comprising a hinge 2 and a hinge slot 3 fitted with the hinge, with both the hinge 2 and the hinge slot 3 being arranged on the yoke 12 of the individual iron core; each individual iron core 1 has one hinge 2 and one hinge slot 3; the hinge 2 is arranged on a side, which rotates about the rotor shaft clockwise, of the yoke 12 of the individual iron core, and the hinge slot 3 is arranged on a side, which rotates about the rotor shaft counterclockwise, of the yoke 12 of the individual iron core; and the individual iron cores 1 have a same structure, size and shape.

The hinge 2 consists of a fitting segment 21 fitted with the hinge slot 3 and a connecting segment 22 for connecting the fitting segment 21 with the yoke 12; the fitting segment 21 has a circular shape along a radial cross-section of the rotor shaft; an outside edge of the connecting segment 22 looks like a sloped structure which runs from the yoke 12 side to the fitting segment 21 side and extends inward, an inside edge of the connecting segment 22 looks like a sloped structure which runs from the yoke 12 side to the fitting segment 21 side and extends inward, and the inside edge of the connecting segment 22 is entirely located outside endpoints of the fitting segment 21; a notch 4, which gives the way to the connecting segment of the hinge, is formed at an end of an outer edge of a side, which rotates along the rotor shaft, of the yoke 12; an opening of the hinge slot 3 is communicated with the notch; the hinge slot 3 has an arced shape along the radial cross-section of the rotor shaft, with an arc angle of 260°; both a center of a circle of the fitting segment 21 of the hinge 2 and a center of a circle of the hinge slot 3 are in the circumference of a circle taking a center of the stator core as its center; and the opening of the hinge slot 3 has a width less than a diameter of the fitting segment 21 of the hinge.

The yoke 12 comprises an external yoke segment 121 and an internal yoke segment 122; the notch 4, the hinge slot 3 and the hinge 2 are all located on the external yoke segment 121, and the internal yoke segment 122 looks like a trapezoidal structure which is narrow inside and wide outside; all the individual iron cores 1 are connected to form the stator core, so that sides 1221 of the trapezoidal structures of the internal yoke segments 122 of two adjacent individual iron cores 1 are pressed against each other, an inner edge of the connecting segment 22 of the hinge 2 is pressed against an outer edge of the internal yoke segment 122, and the outer edge of the internal yoke segment 122 is in smooth connection to the opening of the hinge slot 3; and a centerline of an included angle formed by two sides 1221 of the trapezoidal structure of the internal yoke segment 122 is on a diameter line of the stator core. The center of the external yoke segment 121 is recessed inward to form a positioning groove 1211, and the positioning groove 1211 looks like a trapezoidal structure which is wide inside and narrow outside; and an inner rim 1222 of the internal yoke segment is arranged linearly and is in smooth connection to the teeth 11.

The individual iron core 1 has a plurality of through slots which axially runs through the individual iron core 1 along the rotor shaft, and the through slots are elongated; each individual iron core 1 comprises two first slots 13 and two second slots 14; there is an included angle between one of the first slots 13 and one of the second slots 14; the first slots 13 are arranged symmetrically about the second slots 14; and the first slots 13 are located on the yoke. The second slots 14 are located on a symmetric line of the teeth 11, and the first slots 13 and the second slots 14 are vertical to each other.

An inner rim of the hinge 2 of the individual iron core 1 has a same shape as an outer rim 1223 of the internal yoke segment of an adjacent individual iron core and an inner rim of the hinge slot 3, the hinge 2 is fitted with the hinge slot 3 so that the inner edge of the hinge of one individual iron core is tightly and seamlessly connected to the outer edge of the internal yoke segment of an adjacent individual iron core. Gaps are formed between the teeth 11 of the individual iron cores 1 of the stator core.

Due to the arrangement of the hinge and the hinge slot in the present invention, adjacent individual iron cores can be connected only by axial insertion. It is difficult for the individual iron cores, which are well connected, to disengage from each other along the rotation direction of the rotor shaft. The individual iron cores may be arranged in a line in the wire winding procedure, without connecting the first and last individual iron cores. At the end of wire winding, the first and last individual iron cores are connected to form a circular stator core. Finally, a circular stator core of considerable mechanical strength is formed by laser welding. The present invention has the advantages of convenient manufacturing and processing, more convenient wire winding, and high integrity of the magnetic circuit.

The invention claimed is:

1. A hinged stator core, characterized in that the hinged stator core comprises a plurality of individual iron cores each comprising teeth on an inner side and a yoke on an outer side; two adjacent individual iron cores are connected by a hinge structure comprising a hinge and a hinge slot fitted with the hinge, with both the hinge and the hinge slot being arranged on the yoke of the individual iron core; the hinge and the hinge slot are arranged on a side, which rotates about a rotor shaft clockwise and/or on a side, which rotates about a rotor shaft counterclockwise, of the yoke of the individual iron core; the hinge consists of a fitting segment fitted with the hinge slot and a connecting segment for connecting the fitting segment with the yoke; the fitting segment has a circular or segmental shape along a radial cross-section of the rotor shaft; an outside edge of the connecting segment looks like a sloped structure which runs from the yoke side to the fitting segment side and extends inward, an inside edge of the connecting segment looks like a sloped structure which runs from the yoke side to the fitting segment side and extends inward, and the inside edge of the connecting segment is entirely located outside endpoints of the fitting segment; a notch, which gives the way to the connecting segment of the hinge, is formed at an end of an outer edge of a side, which rotates along the rotor shaft, of the yoke; an opening of the hinge slot is communicated with the notch; the hinge slot has an arced shape along the radial cross-section of the rotor shaft, with an arc angle of above 180°; both a center of a circle of the fitting segment of the hinge and a center of a circle of the hinge slot are in the circumference of a circle taking a center of the stator core as its center; the opening of the hinge slot has a width less than a diameter of the fitting segment of the hinge; the yoke comprises an external yoke segment and an internal yoke segment; the notch, the hinge slot and the hinge are all located on the external yoke segment, and the internal yoke segment looks like a trapezoidal structure which is narrow inside and wide outside; all the individual iron cores are connected to form the stator core, so that sides of the trapezoidal structures of the internal yoke segments of two adjacent individual iron cores are pressed against each other, an inner edge of the connecting segment of the hinge is pressed against an outer edge of the internal yoke segment, and the outer edge of the internal yoke segment is in smooth connection to the opening of the hinge slot;

wherein one of the hinge and the hinge slot is arranged on a side, which rotates about the rotor shaft clockwise, of the yoke of the individual iron core, and the other one of the hinge and the hinge slot is arranged on a side, which rotates about the rotor shaft counterclockwise, of the yoke of the individual iron core;

wherein the individual iron cores of the stator core have a same structure, size and shape;

wherein a centerline of an included angle formed by two sides of the trapezoidal structure of the internal yoke segment is on a diameter line of the stator core;

wherein the center of the external yoke segment is recessed inward to form a positioning groove, and the positioning groove looks like a trapezoidal structure which is wide inside and narrow outside;

wherein an inner rim of the internal yoke segment is arranged linearly and is in smooth connection to the teeth;

wherein the individual iron core has a plurality of through slots which axially runs through the individual iron core along the rotor shaft, and the through slots are elongated; and the individual iron core comprises a plurality of first slots and a plurality of second slots; there is an included angle between one of the first slots and one of the second slots; the first slots are arranged symmetrically about the second slots; and the first slots are located on the yoke;

wherein there are two first slots and two second slots, the second slots are located on a symmetric line of the teeth, and the first slots and the second slots are vertical to each other;

wherein an inner rim of the hinge of the individual iron core has a same shape as an outer rim of the internal yoke segment of an adjacent individual iron core and an inner rim of the hinge slot, the hinge is fitted with the hinge slot so that the inner edge of the hinge of one individual iron core is tightly and seamlessly connected to the outer edge of the internal yoke segment of an adjacent individual iron core; and wherein gaps are formed between the teeth of the individual iron cores of the stator core.

* * * * *